Feb. 13, 1934. L. C. COLE 1,946,839
LATHE
Filed March 27, 1931 7 Sheets-Sheet 1

Inventor
Lyndon C. Cole
By Maréchal & Nor
Attorney

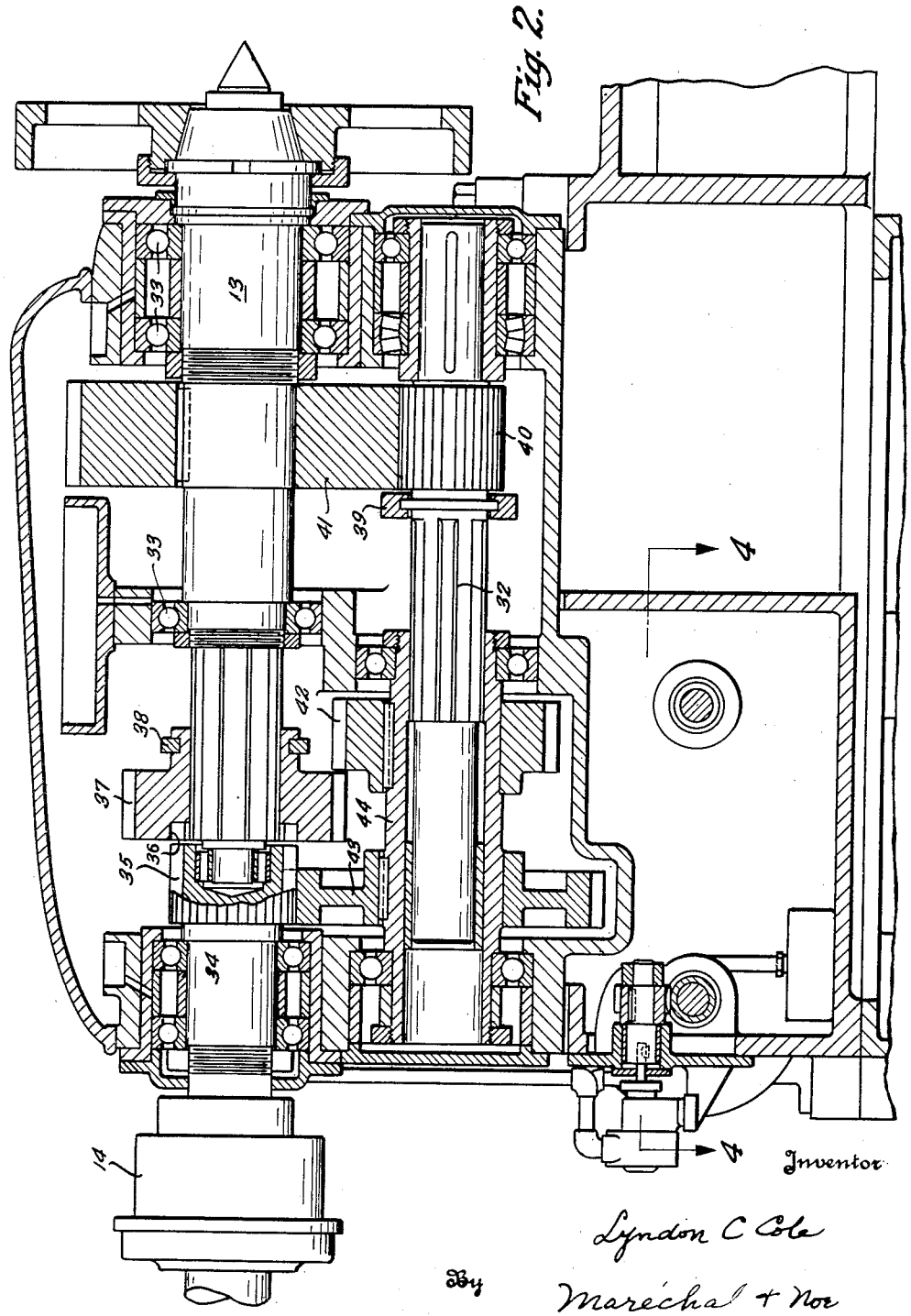

Feb. 13, 1934.   L. C. COLE   1,946,839
LATHE
Filed March 27, 1931   7 Sheets-Sheet 3

Inventor
Lyndon C Cole
By Maréchal + Noe
Attorney

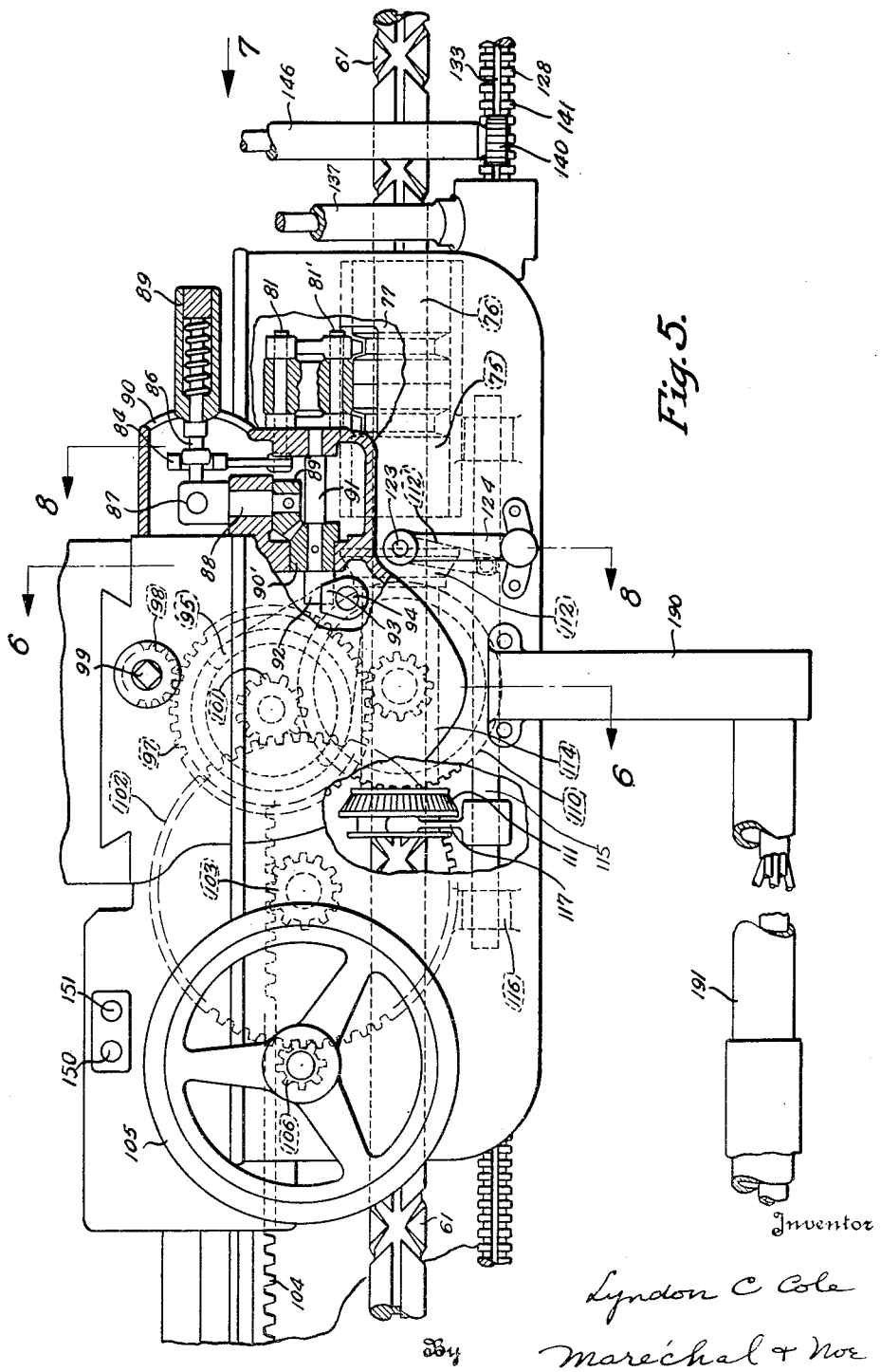

Feb. 13, 1934. L. C. COLE 1,946,839
LATHE
Filed March 27, 1931 7 Sheets-Sheet 5
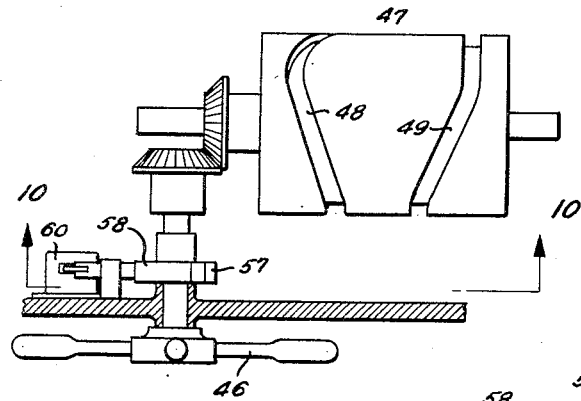
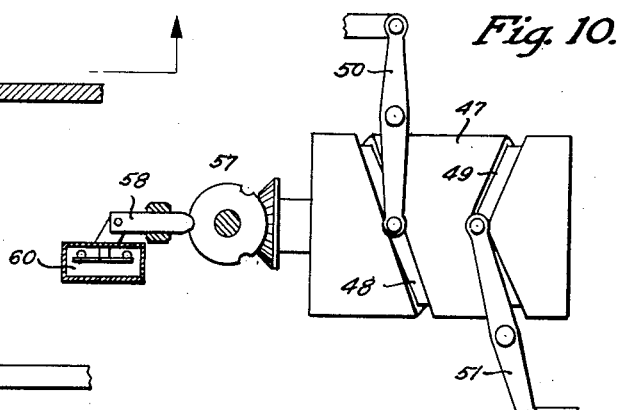
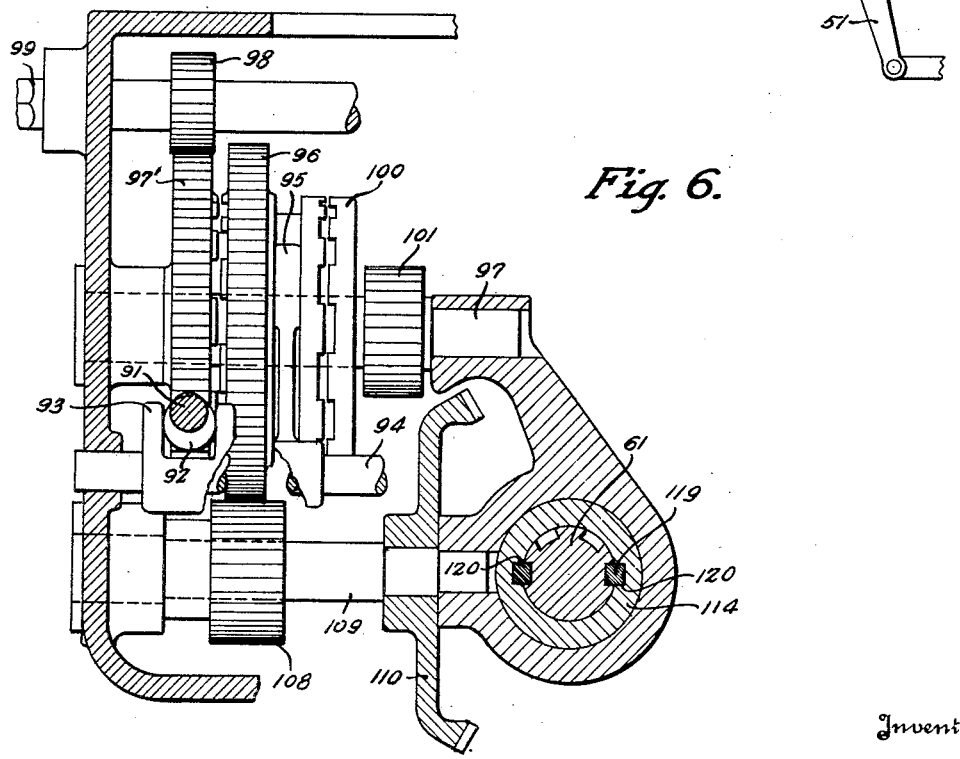
Inventor
Lyndon C Cole
By Maréchal + Noe
Attorney

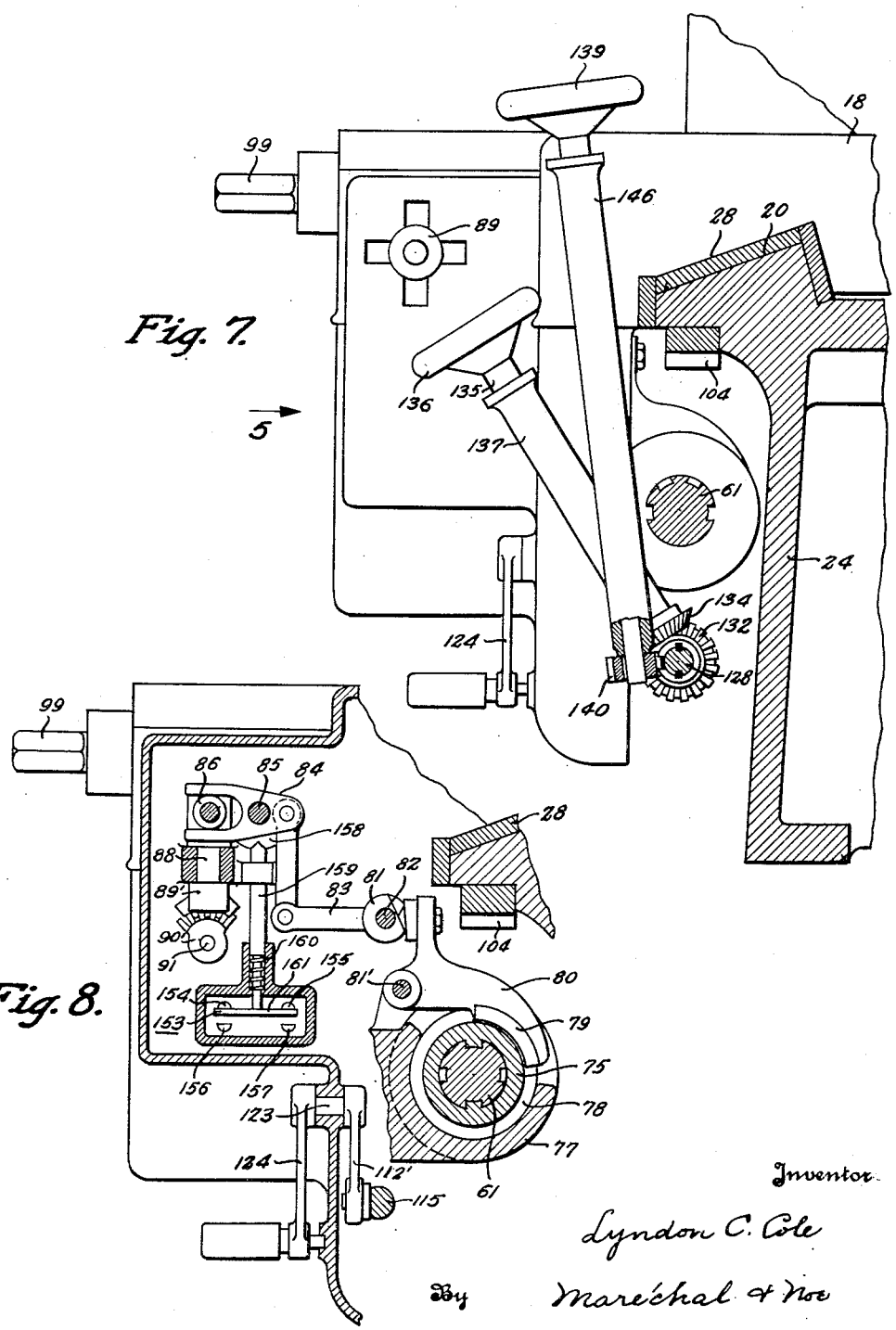

Patented Feb. 13, 1934

1,946,839

UNITED STATES PATENT OFFICE 1,946,839

LATHE

Lyndon C. Cole, Hamilton, Ohio, assignor to General Machinery Corporation, Hamilton, Ohio, a corporation of Delaware Application March 27, 1931. Serial No. 525,735

25 Claims. (Cl. 82—2)

This invention relates to lathes and the like.

One object of the invention is the provision of a lathe having control means on the carriage arranged conveniently accessible to the operator for rapidly traversing and for feeding the carriage in either direction and for controlling the speed of the motor drive.

Another object of the invention is the provision of mechanism on the lathe carriage for controlling its movements and also for electrically controlling the motor drive for the feed and traverse mechanism.

A further object of the invention is the provision, in a lathe, of a differential drive between a constant motor and a variable speed motor and a feed and traverse shaft, means being conveniently provided for controlling the speed of the shaft.

A further object of the invention is the provision of a lathe having a rear way substantially lower than the front way, the bed or base of the lathe having a downwardly and rearwardly inclined top for the unobstructed disposal of chips over the rear way.

A further object of the invention is the provision of an electric interlock for the speed changing gearing which drives the spindle from the main drive motor, for temporarily interrupting the power supply to the motor during speed changing movements of the gearing.

A further object of the invention is the provision of a novel gear changing mechanism for coupling the main driving motor to the work spindle for the desired speed of rotation of the work spindle.

Further objects and advantages of the invention will be apparent from the following description, the appended claims and the accompanying drawings, in which—

Fig. 2 is a longitudinal section through the lathe head showing the speed change gear mechanism;

Fig. 5 is a front elevation of the lathe carriage, parts being shown in section for the purposes of illustration;

Fig. 6 is a section on the line 6—6 of Fig. 5;

Fig. 7 is an end elevation of the front part of the carriage;

Fig. 8 is a transverse section through the front part of the carriage on the line 8—8 of Fig. 5;

Figs. 9 and 10 are detailed views of the gear shifting handle and interlock switch;

Figure 1:
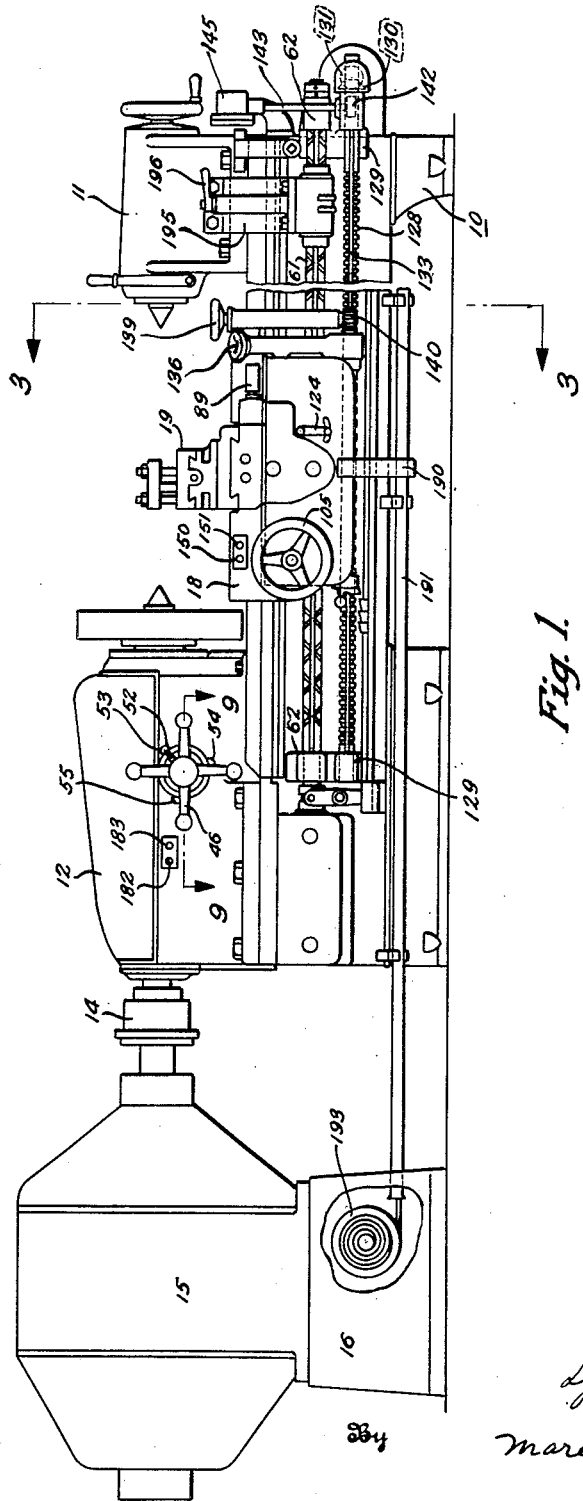
Fig. 1 is a front elevation of a lathe embodying the present invention.
Figure 4:
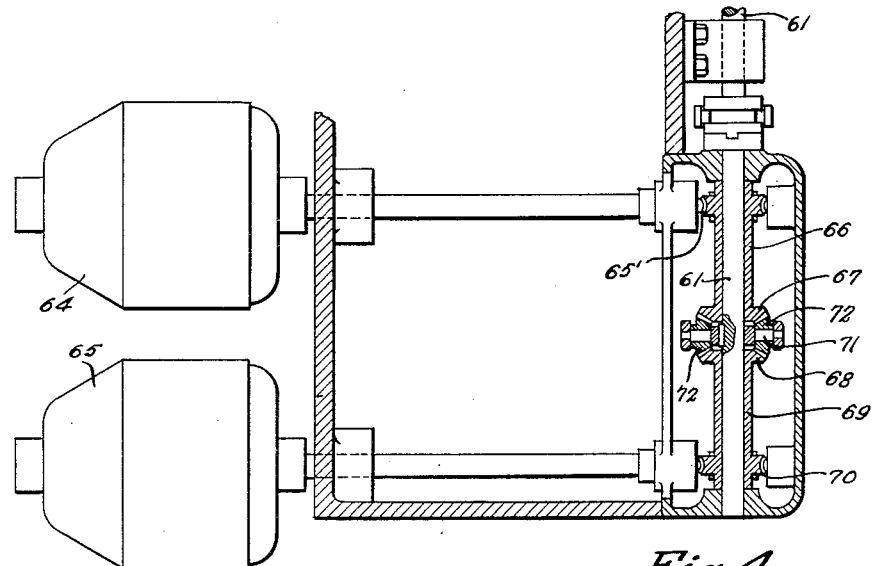
Fig. 4 is a horizontal section on the line 4—4 of Fig. 2, showing the differential motor drive to the carriage moving shaft.
Figure 3:
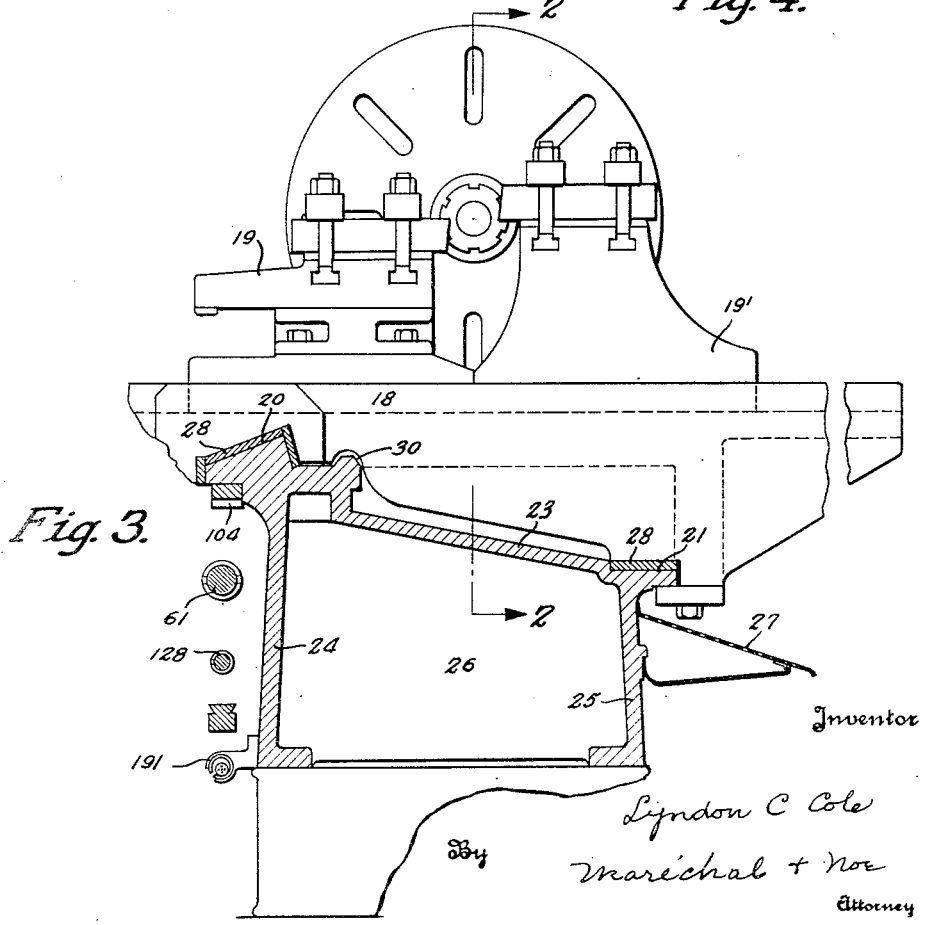
Fig. 3 is a transverse section through the lathe bed on the line 3—3 of Fig. 1, showing part of the carriage.

Referring more particularly to the drawings in which a preferred form of the invention is illustrated, 10 designates the bed of a power lathe on which is supported the tail stock 11 and the headstock 12. Within the headstock is a change speed mechanism for driving the work spindle 13 at various speeds, the power being supplied through a flexible coupling 14 from the motor 15 which is provided on a suitable standard 16. The electric motor is preferably a direct current motor adapted for speed variation. This motor for example may operate at speeds of from 200 to 1200 R. P. M., the control of the speed being effected through suitable resistance devices.

Figure 12:
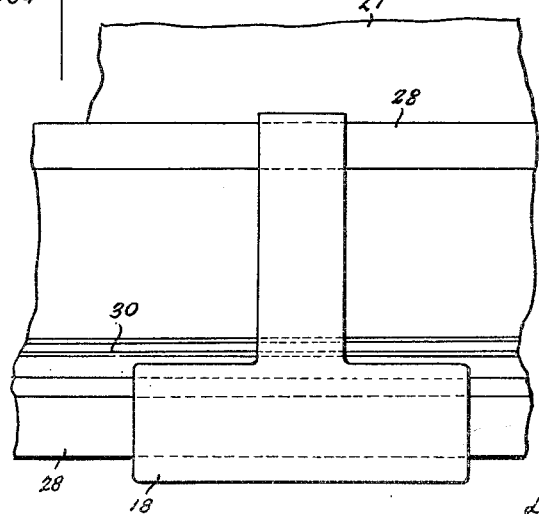
Fig. 12 is a top plan view of a portion of the bed showing the outline of the T-shaped carriage.

On the bed 10 is the carriage 18, slidably supporting the tool rest 19 for movements crosswise of the lathe. The carriage 18, as shown in Fig. 12, is preferably T-shaped, having a comparatively long front or apron portion, giving a long bearing on the bed way 20 and a narrower straight sided rear portion 19'. It is gibbed to the bed on both the front way 20 and the rear way 21. Preferably two tapered gibs on the front side take up wear. The rear way 21 which supports the rear side of the carriage, as shown, is at a considerably lower lever than the front way 20. Extending upwardly and forwardly from the rear way 21 is the bed top wall 23. Connected to the bottom of the bed top 23 and between the front and side walls 24 and 25 of the bed are transverse rigidifying walls 26. The bed top 23 is inclined toward the back for the unobstructed disposition of chips, which pass over the top of the rear way 21, over the liquid collector 27 and are then received in a suitable pan or chip conveyor provided at the rear of the lathe. The straight sided rear portion 19 of the carriage shoves the chips off of the rear way if they should tend to collect there. The ways 20 and 21 are covered by hardened and ground steel plates 28 securely fastened to the bed. The rear way 21 slidingly supports the rear side of the tailstock 11, the front side of which slides on the inverted V-guide 30.

As previously mentioned, the rear way 21 of the bed supports both the tail stock and the carriage. The front portions of both of these movable members, however, are supported on different front ways, the first front way 20 supporting the rather long front part of the carriage, while the second front way 30, which is provided to the rear of the extended front portion of the carriage, as shown in Fig. 12, slidingly supports the front side of the tail stock. This permits the tail stock to be brought up close to the straight sided rear portion 19' of the carriage. This provides a simple construction as the flat rear way 21 forms a common support for both the carriage and the tail stock, and the straight sides of the carriage permit the chips to move along to the rear without accumulating on the inclined top surface 23.

The change speed drive in the headstock is of simple design providing for the direct drive of the spindle 13 from the motor 15 and also providing for two lower speeds through a counter shaft 32 which is rotatably supported preferably below the spindle 13. The spindle 13 is rotatably mounted in suitable antifriction bearings 33, the left end of the spindle being rotatably mounted in the forward end of the drive shaft 34. On the front of the drive shaft is fixed a drive pinion 35 the teeth of which are adapted to engage internal teeth 36 in a gear 37 which is slidably mounted on and splined to the spindle 13. When the gear 37 is moved to the left into engagement with the pinion 35 by movement of the shifting collar 38, the drive shaft 34 is directly connected to the spindle 13 so that the spindle may be driven at high speed, this high speed being capable of control by variation of the motor speed to any desired value. When lower spindle speeds are desired than the lowest motor speed obtainable in direct drive position of the parts, the gear 37 is moved to the right to the position shown in Fig. 2, and at the same time the entire countershaft 32, which is constantly rotated by drive pinion 35, is moved to the right by means of the shifting collar 39 to the position shown so that the pinion 40 is in driving engagement with the gear 41 fixed to the spindle. A small gear 42, fixed to the countershaft, under these conditions is out of mesh with the gear 37. However, if the entire countershaft 32 is moved to the left from its position shown as to disengage gears 40 and 41, gear 37 is then brought into mesh with gear 42 by movement of gear 37 toward the right from the position shown in Fig. 2. Then the drive shaft operates the spindle 13 at the slowest speed, the drive being through pinion 35, driven gear 43, sleeve 44 splined on the countershaft 32, gear 42 and gear 37 splined on the spindle shaft. It will be understood that in any of the three drive positions of the gears the motor speed may be varied, so that a very wide speed range of the spindle from very slow speed up to the maximum motor speed is obtainable.

The shifting collars 38 and 39 are preferably simultaneously operated by means of a single control handle or wheel 46, shown on the front side of the head-stock. Rotation of the wheel 46 selects the desired speed change. Thus as shown the wheel 46 is geared to a cam drum 47 having roller guiding cam grooves 48 and 49 respectively controlling the movement of levers 50 and 51 connected to the two shifting collars 38 and 39 and providing for the three speeds of the spindle as the wheel 46 is rotated to bring the pointer 52 opposite the three index marks 53, 54 and 55. An interlocking switch is incorporated with the wheel 46 so as to automatically interrupt the supply of current to the main drive motor 15 during the time the wheel 46 is being moved from one position to another, that is, during the time the gears are being shifted. As shown, a notched plate 57 is rotated by the wheel 46, the three notches being adapted to successively receive the nose of a spring pressed plunger 58 when one of the index marks 53, 54 or 55 is opposite the pointer 52, or when the gears are in fully engaged positions for one of the drives. However, as soon as the wheel 46 is rotated a slight amount the spring pressed plunger 58 is forced out of the notch in which it is received and operates a switch 60 connected by a suitable relay device to the motor supply so as to interrupt the supply of current and thus remove the driving force from the spindle until the gear shifting movement has been completed, at which time the nose of the plunger 58 will again be received in one of the notches and power supplied again to the motor.

Rotatably mounted at the front of the bed 10 is a shaft 61 suitably journaled at 62 adjacent opposite ends of the bed. This shaft, which is effective in both feeding and rapid traversing movements of the carriage and in rapid traversing of the tailstock, is rotated through a differential drive from a constant speed motor 64 and a variable speed motor 65. The motor 64 which may operate at a speed of 2000 R. P. M. for example, is connected by a suitable worm and worm gear drive 65 having a reduction of 20 to 1, to a sleeve 66 having thereon a bevel gear 67. Adjacent the bevel gear 67 is another bevel gear 68 normally rotating in the opposite direction, fixed to sleeve 69 which is driven by a worm and worm gear drive 70, having a reduction of 5 to 1, from the motor 65 which may operate at speeds varying from 500 to 2000 R. P. M. The helix angle of the worm driven by the constant speed motor is preferably low so the constant speed motor will not be driven by the variable speed motor through the differential gearing. The shaft 61 supports the sleeves 66 and 69, shaft 61 having a spider 71 rotatably supporting bevel gears 72 which mesh with the two gears 67 and 68. Thus power is supplied to drive the shaft from both motors, and the speed of the shaft depends upon the speeds of the two motors. For example, if the motor 65 is stopped, the differential drive effects actuation of the shaft 61, driven at this time entirely from the motor 64. When the motor 65 is operating at its minimum speed so as to rotate the two sleeves 66 and 69 at the same speed, the shaft 61 is stationary. Increase of the speed of motor 65 then gradually increases the speed of the shaft 61 so that any desired speed of rotation of shaft 61 can be obtained.

The shaft 61 is provided with both right and left-hand threads of coarse lead and is also provided with one or more longitudinally extending keyways, two independent mechanisms being provided on the carriage, one in engagement with the ways and the other in engagement with the threads for effecting feeding movements and rapid traverse movements of the carriage longitudinally of the bed, for moving the tool rest crosswise of the lathe, and for rapid traverse of the tailstock. The preferred mechanisms for obtaining these movements are shown in Figs. 5 to 8 inclusive. As therein shown, a pair of nuts are threaded on the shaft 61 one of the nuts having right-hand threads and the other having left-hand threads, the nuts being held in the apron 77 of the carriage against endwise movement. These nuts may rotate freely with the shaft 61 when the carriage is stationary, and either of the nuts may be held against rotation, as desired so as to effect rapid traverse movements of the carriage longitudinally of the bed. The means for selectively holding a nut against rotation may comprise a wedge shaped annular groove 78 in the nut, adapted to be engaged by an interfitting wedge 79 provided on arm 80 pivotally supported in any suitable manner at 81'. It will be understood that an arm 80 is provided for each of the nuts, and the two arms are independently and selectively rotated clockwise as viewed in Fig. 8 to engage the nuts by rotational movements of the two cams 81 supported on shaft 82. The cams 81 are fixed to arm 83 which is rocked by lever 84 pivoted on a shaft 85. The left end of the arm 84 is forked outwardly and receives the shifting lever 86. This lever is shown in Fig. 5 as pivotally connected at 87 to a rotatable shaft 88 so that the hand lever 89 may be swung either upwardly or downwardly to effect rocking movements of the cams 81 for selective control of the rapid traverse nuts. The hand lever 89 projects through a cross shaped slot 90 in an enclosing housing portion on the carriage. Lever 89 moves horizontally as well as vertically. Horizontal movements of the lever 89 are without effect on the cams 81 so that the cam wedge levers 80 may remain in their normal position free of the nuts, as shown in Fig. 8 while rotational movements of shaft 88 are caused for the control of the feed. Pinned to the shaft 88 is a bevel gear segment 89 meshing with a gear segment 90 on a shaft 91. On the end of shaft 91 is an eccentric cam 92 which operates in an upwardly extending fork 93 provided on the end of a shift rod 94. Rigid with the shift rod 94 is an arm 95 acting as a gear shifting collar for gear 96 which is rotatably supported on a shaft 97 in the carriage apron. Movement of the shift rod 94 in one direction clutches left-hand side of gear 96 to a gear 97 meshing with pinion 98 on a carriage supported shaft 99. On the shaft 99 is a suitable driving connection to the tool slide for effecting cross movements of the tool slide on the carriage. Movement of the gear 96 to the right unclutches it from gear 97 and clutches it through clutch 100 to a pinion 101 on shaft 97. Pinion 101 meshes with a gear 102 rotatably supported on the carriage apron. Fixed to gear 102 is a rack pinion 103 meshing with the teeth of a rack 104 provided on the front of the base 10. Thus when the small gear 101 is rotated the carriage will be fed longitudinally of the bed ways. Longitudinal movement may also be effected manually by means of the hand wheel 105 having a pinion 106 fixed to it, pinion 106 meshing with the gear 102.

The gear 96 shown in Fig. 6 is rotated in either direction by means of the driven pinion 108 in the following manner. Gear 108 is fixed to shaft 109 on which is a bevel gear 110. This bevel gear is adapted to be engaged selectively by either bevel pinion 111 or bevel pinion 112 as the latter are moved longitudinally along the carriage. The two beveled pinions are fixed together by means of the sleeve 114 but rotate with the shaft 61. Normally both bevel pinions 111 and 112 are spaced away from the bevel gear 110, but either one or the other may be brought into engagement with the bevel gear by shifting movements of a rod 115 slidably supported at 116 on the carriage. On the rod 115 is fixed a shifter 117 which engages an annular groove on one of the bevel pinions, namely the pinion 111. These bevel pinions have keys 119 secured thereto, the keys being longitudinally movable with relation to the two ways 120 provided in the shaft 61. The bevel pinions 111 and 112 are therefore rotated constantly by the shaft 61, cooperating in no way with the threads on shaft 61 and therefore having no tendency to travel along the shaft of their own accord. When either bevel pinion is coupled to the bevel gear 110 however the latter is rotated and this rotates the gear 96 for either moving the carriage longitudinally along the ways or else effecting crosswise movements of the tool support. The shift rod 115 is pivotally connected to an arm 112' rotatably supported on a shaft 123, this shaft being operated by a control arm 124 which may be swung either to the right or to the left for selecting the desired direction of rotation of the drive pinion 108. The feeding movements of the carriage, that is the movement of the carriage during cutting operations, are therefore controlled by the arm 124 and by horizontal movements of the control lever 89, these parts also controlling the cross feed of the tool support.

Variation of the speed of the main drive motor 15 of the lathe is accomplished by rotational movements of a rod 128 adapted for endwise and rotational movements in suitable bearings 129 on the lathe bed. On the rod 128 is a bevel pinion 130 meshing with a bevel gear 131 which is connected to the field rheostat of the motor 15. This rotational movement of rod 128 is controlled through a bevel gear 132 slidably keyed in the keyway 133, bevel gear 132 meshing with an operating bevel gear 134 fixed to a rotatable shaft 135 operated by a suitable hand lever or wheel 136 under the control of the operator. The shaft 135 is rotatably supported in a standard 137 fixed on the carriage apron.

The shaft 128 is moved endwise by means of a handwheel 139 which operates a spur gear 140 meshing with annular rack teeth 141 on the shaft 128. Near the right-hand end of the shaft 128 are similar annular rack teeth that mesh with a rotatable pinion 142 operably connected to shaft 143 that leads up to a field rheostat box 145 controlling the field current of the variable speed motor 65. A suitable standard 146 on the carriage apron rotatably supports the handwheel 139 and pinion 130. It will be understood that any other suitable control means may be provided for either shifting the rod 128 endwise or rotating it as desired, such means being under the convenient control of the operator and preferably provided on the carriage apron in an accessible position.

On the lathe carriage is a start switch button 150 and a stop switch button 151 which control the starting and stopping of the three motors 15, 64 and 65. When the start button 150 is pressed by the operator the main motor and the two feed motors are simultaneously started if the cut-out switch 60 actuated by the shift lever on the back gears is closed. Additional electrical control means are provided on the carriage so that the attendant can readily control the feed speeds and traversing operations as will now be described. This control provides for automatically stopping the variable speed motor 65 when the hand lever 89 is moved up or down for traversing, so that the screw shaft 61 will be rotated rapidly. The variable speed motor is again cut into circuit when the control lever 89 is in its normal or intermediate position so that the screw shaft 61 will be rotated at the desired speed as controlled by the rod 128.

Figure 11:
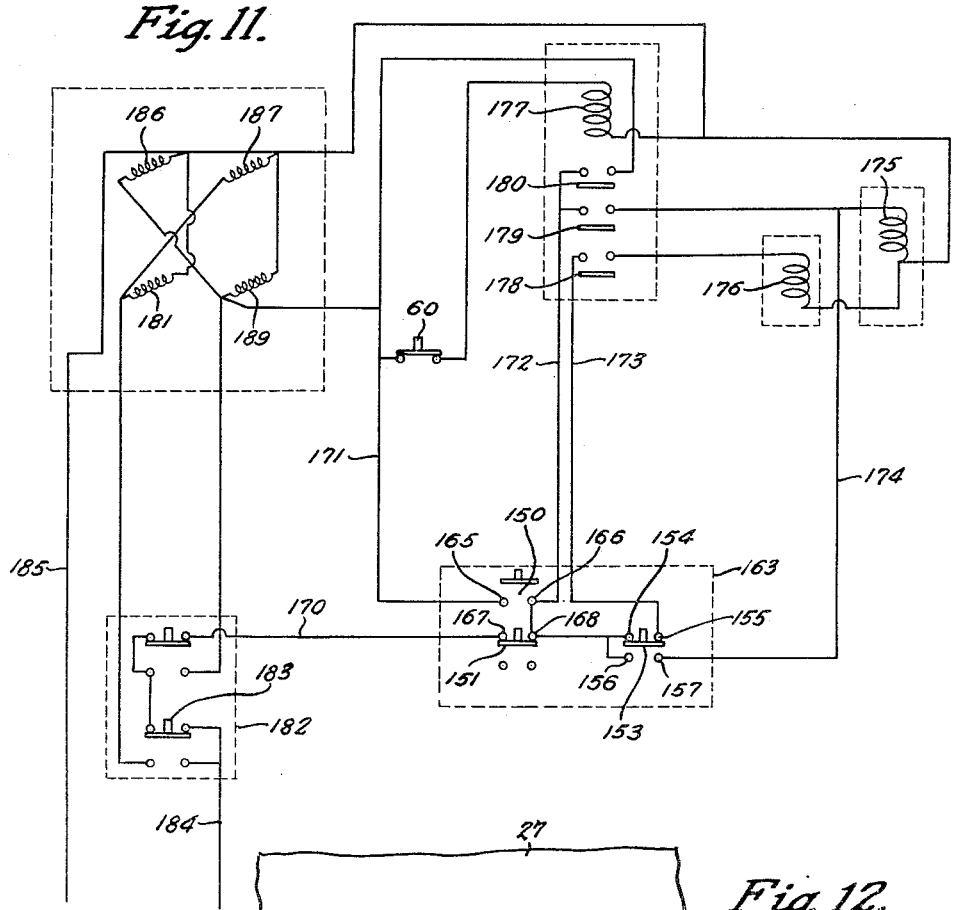
Fig. 11 is a diagrammatic view of the electrical connections for the electrical control of the several motors.

As shown in Fig. 8 switch means designated generally 153 is provided for starting and stopping the variable speed motor 65, this switch means being automatically operated so as to break the connection between contacts 154 and 155 and close a connection between contacts 156 and 157. On the shaft 85, which is rotated when the hand lever 89 is moved up and down, is a cam plate 158 having a notch that receives the upper end of a longitudinally movable rod 159. The lower end of this rod is pressed upwardly by a spring 160 and supports the contact plate 161 which bridges the opposed contacts. As soon as the hand lever 89 is moved up or down from its normal position the switch means 153 will therefore be operated to automatically control the operation of the variable speed motor and without any further effort being required on the part of the operator. As shown in Fig. 11 the dotted rectangle 163 encloses the various switches that are provided on the lathe carriage, namely the switch means designated generally 153 under the automatic control of the rapid traverse hand lever 89, and the start and stop push buttons for starting and stopping the main drive motor 15. When the start switch 150 is operated a circuit is completed between contacts 165 and 166, connection being maintained between contacts 167 and 168 of the stop switch. These various switches are connected by wires 170, 171, 172, 173 and 174 to the several controlling relays and switches as shown. 175 designates the line contactor coil of a controller for the constant speed feed and traverse motor 64. 176 designates the line contactor coil of a controller for the adjustable speed feed motor 65. 177 is a relay coil controlling the switch plates 178, 179 and 180, which are connected together so as to bridge the connections from the wire 172 to the several line contactor coils shown. The interlock switch 60 is connected to wire 171. Wire 170 extends to a jog switch 182, preferably mounted on the forward side of the headstock for jogging the main motor forwardly. A reverse jog switch 183 is also provided adjacent the switch 182. Line wire 184 leads from the reverse jog switch as shown, the other line wire 185 being connected to the relays 177 and to the controlling coils 186, 187, 188 and 189 which control the operation of the main motor 15. The construction is such that pressing the start button 150 on the carriage starts the main motor and the two feed motors simultaneously. Pressing the stop button 151 or opening of the interlock switch 60 stops all three motors simultaneously. While the three motors are running, the operation of the traverse lever 89 in a vertical direction opens the circuit between contacts 154 and 155 and closes the circuit between contacts 156 and 157 which causes the adjustable speed motor 165 to stop as long as the contact plate 161 is depressed. Of course when the variable speed motor stops the traversing and feed screw 61 is operated rapidly for rapid traverse movements of the carriage. When the switch means 153 is released by return of the hand lever 89 to its normal intermediate position, the adjustable feed motor 65 will run again. While the three motors are at a standstill operation of the lever 89 on the carriage for rapid traversing operates the switch 153 causing the constant speed motor 65 to start to obtain traversing movements of the shaft 61 so long as the switch means 153 is depressed. Thus traversing movements of the carriage and the tailstock can be obtained whether or not the main drive motor is operating and regardless of whether or not the interlock switch 60 is closed. While the three motors are at a standstill the main drive motor may be jogged in either the forward or reverse direction by means of the push buttons 182 and 183 on the headstock. This operation may also be obtained whether or not the interlock switch 60 on the headstock is closed. A solenoid brake is preferably provided for holding the shaft of the adjustable speed motor 65 during traversing so that as the supply of current to the motor 65 is interrupted the solenoid coil of the brake will be deenergized and the brake applied by a suitable spring means or the like, the solenoid coil being connected in parallel with the armature of this motor.

The various wires 170 to 174 inclusive that extend from the carriage to the switch relays and control devices shown in Fig. 11, pass downwardly through a suitable casing 190 on the carriage and then extend through a telescopic tube support 191 mounted on the carriage and on the base 10 of the lathe. The tube 191 which encloses the several wires extends to the left to a point adjacent a spring wound drum so that as the carriage is moved along the lathe the wires may be paid out or taken in automatically by the drum while maintaining electrical connections to the switch relays and control devices hereinbefore described.

It has been mentioned that the shaft 61 is employed to traverse the tailstock as well as for moving the carriage and tool rest. The tailstock supports a bracket 195 at the front of the lathe which contains right and left hand nuts cooperating with the threads on the shaft 61, and adapted to be selectively held against rotation for traversing the tailstock to the right or left by movement of the lever 196. The construction of these nuts and the manner in which one or the other may be held against rotation is preferably similar to the nuts of the carriage previously described.

It will now be apparent that the various controls for the feeding and traversing movements and cross-feed of the tool support and a variation in speeds of the several motors may be very readily and conveniently made by the operator, all of these control devices being conveniently placed in a very accessible manner and requiring the minimum of thought and attention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a lathe, in combination, a bed, a carriage movable thereon, a feed and rapid traverse shaft rotatably mounted on said bed, means rotatably mounted on the carriage for continuous rotation by said shaft, feed mechanism operated by said means, additional means on said carriage having threaded engagement with said shaft for traversing said carriage, electric motor means for driving said shaft, and means for varying the speed of said electric motor means.

2. In a lathe, in combination, a bed, a carriage movable thereon, a combined feed and traverse shaft rotatably mounted on said bed, mechanism connecting said shaft and carriage for feeding movements of the carriage, traverse mechanism connecting said shaft and said carriage, a pair of motors for driving said shaft, differential mechanism connecting said motors and said shaft, and means for controlling the speed of one of said motors to control the speed of said shaft.

3. In a lathe, in combination, a bed, a carriage movable thereon, a feed and rapid traverse shaft rotatably mounted on said lathe and having right and left-hand screw threads of coarse lead, a pair of nuts rotatably mounted on said carriage adapted for independent cooperation with the screw threads of said shaft for rapidly traversing the carriage in either direction, and means rotatably mounted on said carriage for continuous rotation by said shaft for feeding the carriage in either direction.

4. In a lathe, in combination, a bed, a carriage movable thereon, a right and left-hand threaded shaft having a longitudinal way rotatably mounted on said bed, means on said carriage cooperating with said way for feeding the carriage in either direction, and means cooperating with the threads on said shaft for rapidly traversing the carriage in either direction.

5. In a lathe, in combination, a bed, a carriage movable thereon, a right and left-hand threaded shaft having a longitudinal way rotatably mounted on said bed, means on said carriage cooperating with said way for feeding the carriage in either direction, means cooperating with the threads on said shaft for traversing the carriage in either direction, and a single lever on said carriage movement of which in one direction operates the feed means, and movement of which in another direction operates the traverse means.

6. In a lathe, in combination, a bed, a carriage movable thereon, a shaft rotatably mounted on said bed, means on said carriage cooperating with said shaft for moving the carriage in either direction, motor means for operating said shaft, control means mounted on said carriage and movable to a plurality of operating positions for controlling carriage movements, and a switch operated by movement of said control means to certain of the operating positions for controlling said motor means.

7. In a lathe, in combination, a bed, a carriage movable thereon, a feed and rapid traverse shaft rotatably mounted on said bed, mechanism cooperating with said shaft for effecting either rapid traverse or feeding movements of said carriage, control means on said carriage controlling said mechanism, a motor for driving said shaft, and switch means on said carriage controlled by said control means for starting and stopping said motor.

8. In a lathe, in combination, a bed, a carriage movable thereon, a feed and rapid traverse shaft rotatably mounted on said base, mechanism cooperating with said shaft for effecting either rapid traverse or feeding movements of said carriage, control means on said carriage controlling said mechanism, a motor for driving said shaft, and switch means on said carriage controlled by said control means during rapid traverse movements thereof for starting said motor.

9. In a lathe, in combination, a bed, a carriage movable thereon, a feed and rapid traverse shaft rotatably mounted on said bed, a constant speed motor, a variable speed motor, differential mechanism connecting said motors to said shaft, mechanism on said carriage cooperating with said shaft to effect either feeding or rapid traverse movements of said carriage, control means controlling said mechanism, and switch means operated by said control means for stopping said variable speed motor for rapid traverse of said carriage.

10. In a lathe, in combination, a bed, a carriage movable thereon, a feed and rapid traverse shaft rotatably mounted on said bed, a constant speed motor, a variable speed motor, differential mechanism connecting said motors to said shaft, mechanism on said carriage cooperating with said shaft to effect either feeding or rapid traverse movements of said carriage, control means controlling said mechanism, and switch means operated by said control means for starting said constant speed motor while said variable speed motor is stopped for effecting rapid traverse of said carriage.

11. In a lathe, in combination, a bed, a carriage movable thereon, a work spindle, a main motor driving said spindle, switch means on said carriage for starting and stopping said main motor, a rotatable shaft mounted on said bed, mechanism on said carriage cooperating with said shaft for moving said carriage in either direction, control means for said mechanism, a variable speed motor, a constant speed motor, differential mechanism connecting said motors to said shaft, switch means on said carriage for starting and stopping all said motors, and switch means on said carriage controlled by said control means for automatically starting said constant speed motor if the main motor is stopped and for automatically stopping said variable speed motor if it is running.

12. In a lathe, in combination, a bed, a carriage movable thereon, a work spindle, a main motor driving said spindle, switch means on said carriage for starting and stopping said main motor, a rotatable shaft mounted on said bed, mechanism on said carriage cooperating with said shaft for rapidly traversing said carriage in either direction and for feeding the carriage in either direction, control means for said mechanism, a variable speed motor, a constant speed motor, differential mechanism connecting said motors to said shaft, switch means on said carriage for starting and stopping all said motors, and switch means on said carriage controlled by rapid traverse movements of said control means for automatically starting said constant speed motor if the main motor is stopped and for automatically stopping said variable speed motor if it is running.

13. In a lathe, in combination, a bed, a carriage movable thereon, a shaft rotatably mounted on said bed, means on said carriage cooperating with said shaft for moving said carriage, a constant speed motor, a variable speed motor, differential mechanism connecting said motors to said shaft, and means mounted on said carriage for varying the speed of said variable speed motor.

14. In a lathe, in combination, a bed, a carriage movable thereon, a feed and rapid traverse shaft rotatably mounted on said bed, means rotatably mounted on the carriage for continuous rotation by said shaft, feed mechanism operated by said means, additional means on said carriage having threads engaging with said shaft for rapidly traversing the carriage, a single lever movable in one plane for effecting rapid traverse of the carriage and movable in another plane for effecting feeding movements of the carriage, and switch means on said carriage operated by said lever while moving to rapid traverse positions to automatically control said motor means to provide for high speed rotation of said shaft.

15. In a lathe, in combination, a bed, a carriage movable thereon, a main motor, a work spindle, change speed gearing connecting said motor to said work spindle, a gear shifting member, and a switch controlled by said member for temporarily interrupting the power supply to 16. In a lathe, in combination, a bed, a carriage movable thereon, a tailstock movable thereon, a combined feed and rapid traverse shaft rotatably mounted on said bed for moving the carriage and tail stock in either direction, means operated by said shaft for feeding the carriage in either direction, additional means operated by said shaft for traversing the carriage in either direction, and means operated by said shaft for traversing the tailstock.

17. In a lathe, in combination, a bed having a front way and a flat surfaced rearwardly extending rear way at a lower level than said front way, a carriage guided on said ways and movable therealong, said carriage being substantially T-shaped having a rear portion guided on the rear way and a considerably longer front portion guided on the front way, said bed having a downwardly and rearwardly inclined top forming a continuous surface terminating at the flat rear way for the unobstructed disposal of chips over the rear way.

18. In a lathe, in combination, a bed, a carriage movable thereon, a shaft rotatably mounted on said bed, means on said carriage cooperating with said shaft for moving the carriage in either direction, motor means for operating said shaft comtion, motor means for operating said shaft comprising a plurality of motors, differential means connecting both motors to said shaft, control means mounted on said carriage and movable to a plurality of operating positions for controlling carriage movements, and a switch operated by movement of said control to certain of the operating positions for controlling said motor means.

19. In a lathe, a bed having a first front way and a flat and substantially horizontal rear way at a lower level than the front way, said bed having a downwardly and rearwardly inclined top forming a continuous surface terminating at the flat rear way for the unobstructed disposal of chips over the rear way, a carriage of substantially T-shape having a relatively narrow rear portion guided on said rear way and a considerably longer front portion guided on said front way, a second front way to the rear of said front portion of the carriage, and a tail stock guided on said second front way and on said rear way.

20. In a machine tool of the character described, relatively movable work and tool carrying members, and means for moving the movable one of said members at various feeding speeds and for traversing said member comprising a drive element, means for controlling the speed of said element, a second drive element, a combined feeding and traversing shaft, differential mechanism interconnecting both of said drive elements and said shaft and through which power is supplied from both said drive elements to said shaft, means for stopping one of said drive elements for the operation of said shaft solely by the other of said drive elements, and coupling mechanism operably connecting said shaft to said movable member.

21. In a machine tool of the character described, relatively movable work and tool carrying members, and means for moving the movable one of said members at various feeding speeds and for traversing said member comprising a combined feed and traverse shaft operably connected to said movable member, a pair of electric motors for driving said shaft, differential mechanism connecting both said motors and said shaft and through which power is supplied from both of said motors simultaneously, and means for controlling the motor speeds to control the speed of said shaft.

22. In a machine tool of the character described, relatively movable work and tool carrying members, and means for moving the movable one of said members at various feeding speeds and for traversing said member comprising a drive motor, a second drive motor, a combined feed and traverse shaft, differential mechanism interconnecting said drive motors and said shaft and through which power is supplied from both of said motors simultaneously, means for controlling said motors including means for varying the speed of one of said motors to control the speed of said shaft, and coupling mechanism operably connecting said shaft and said movable member.

23. In a machine tool of the character described, relatively movable work and tool carrying members, and means for moving the movable one of said members at various feeding speeds and for traversing said member comprising a drive motor, means for controlling the speed of said motor, a second drive motor, a combined feed and traverse shaft, differential mechanism interconnecting said drive motors and said shaft and through which power is supplied from both of said motors simultaneously, coupling mechanism operably connecting said shaft and said movable member, control means controlling said mechanism, and switch means operated by said control means for stopping and starting one of said motors.

24. In a lathe, a movable tool carrying member, and means for moving said member at various feeding speeds and for traversing said member comprising a variable speed electric motor, means for controlling the speed of said motor, a constant speed electric motor, a combined feeding and traversing shaft operable in one direction at various speeds of rotation, differential mechanism interconnecting said motor and said shaft and through which power is supplied from both of said motors simultaneously, coupling mechanism operably connecting said shaft and movable member, control means for controlling said mechanism and switch means operated by said control means for starting and stopping one of said motors.

25. In a lathe, in combination, a bed, a carriage movable along said bed, a combined feed and rapid traverse shaft rotatably mounted on said bed for moving the carriage in either direction, means for operably connecting said shaft and carriage for feeding the carriage, additional means for operably interconnecting said shaft and carriage for traversing said carriage, a plurality of driving motors, differential means for rotating said shaft from both said motors simultaneously for feeding operations of said shaft, and means for controlling the speed of one of said motors so that the shaft is stationary for a minimum feeding speed while both motors are operating and connected to the shaft through said differential means.

LYNDON C. COLE.